R. E. HELLMUND.
SYSTEM OF CONTROL.
APPLICATION FILED APR. 29, 1915.
1,311,511.
Patented July 29, 1919.
2 SHEETS—SHEET 1.
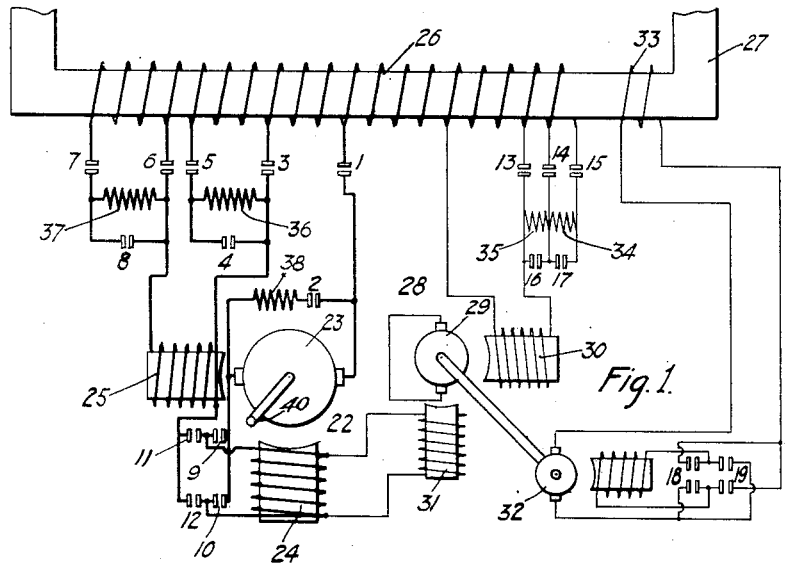
Fig. 1.
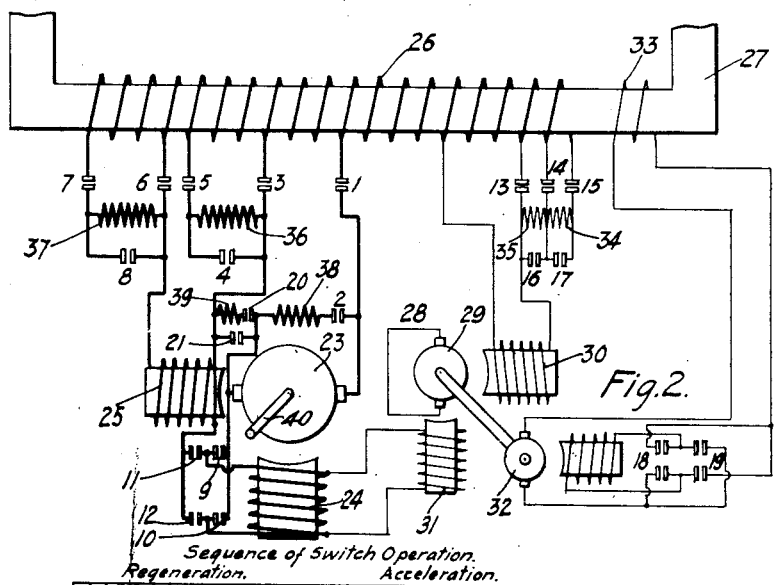
Fig. 2.
Fig. 3.
WITNESSES:
INVENTOR
Rudolf E. Hellmund.
BY
ATTORNEY Fig. 4. ACCELERATING.
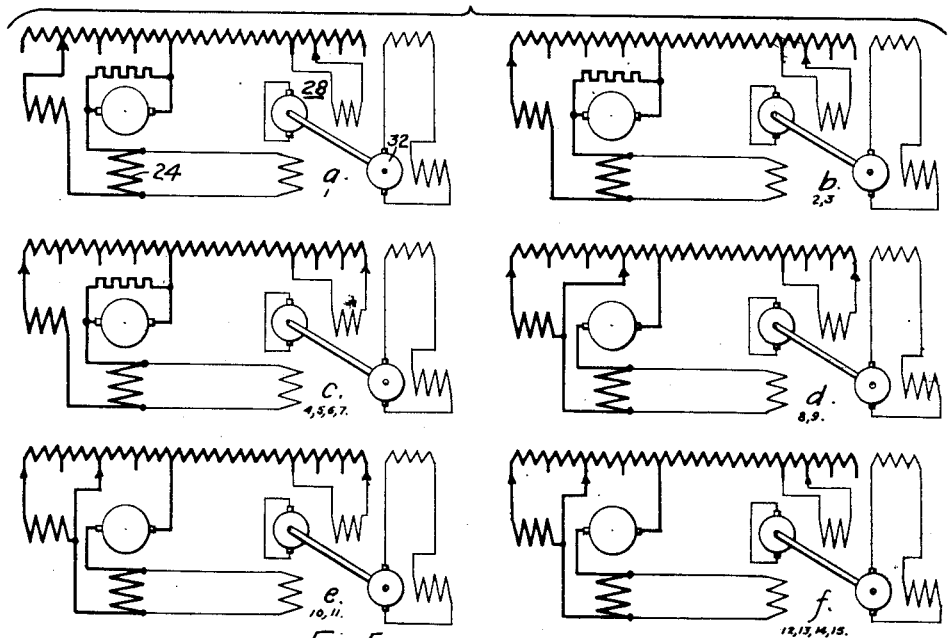
Fig. 5. REGENERATING.
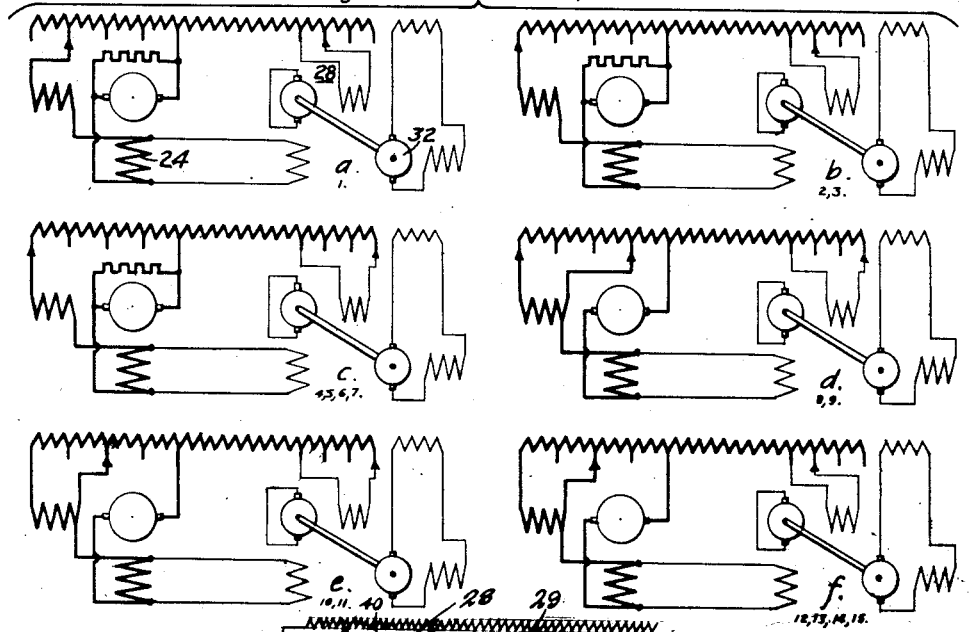
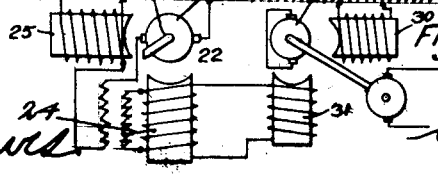
Fig. 6.
INVENTOR
Rudolf E. Hellmund.

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,311,511.     Specification of Letters Patent.     Patented July 29, 1919.

Application filed April 29, 1915.   Serial No. 24,738.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to control systems for dynamo-electric machines of the alternating - current series, commutating type which may be required to operate either as motors or as generators and wherein an auxiliary source of current is employed to supplement the excitation of the main field winding from the main current source.

My invention has for its object to provide a system of the character specified wherein the speed control of the machine, when operating as a motor, or the power output thereof, when operating as a generator, shall be fixed and determinate, irrespective of fluctuations in the voltage of the main source, and wherein the auxiliary source of current may be smaller than has hitherto been customarily employed with a main machine of certain capacity.

In the operation of alternating-current distribution systems where the load is of the nature of motors driving mechanical devices subject to reversal, such, for example, as railway vehicles and hoisting apparatus, it is frequently desirable that means be provided whereby energy may be returned to the system whenever the mechanical device is giving out energy, as, for example, when the railway vehicle is descending grades or decelerating or when the hoisting apparatus is lowering loads. The ordinary alternating-current dynamo-electric machine is unable to excite itself, when operating as a generator, to produce current at a definite frequency, because there is no controlling force to reverse the magnetic field at the proper rate. When supplying current to a source of alternating current, exciting current cannot be derived directly therefrom because of improper phase relation. It is, therefore, necessary to employ an auxiliary exciting machine, such, for example, as a phase-converter operating from the source, as disclosed in U. S. Patent No. 977,641, granted Dec. 6, 1910, to the Westinghouse Electric & Manufacturing Company on an application filed by Benjamin G. Lamme.

Where auxiliary apparatus of this nature is provided of sufficient capacity to carry the entire excitation load, it necessarily becomes cumbersome and expensive, the weight being a serious disadvantage on electric vehicles. By my invention, I am enabled to obtain satisfactory field excitation, during both the motor operation and the generator operation, by supplying the main field windings with current obtained by the vector addition of current derived from the source and current derived from a small auxiliary exciting machine. Not only am I enabled, in this manner, to reduce the size of the exciting machine with respect to exciters previously employed, but, by adjusting the relative amounts of current supplied to the main field winding by the two component sources connected thereto, I am enabled to adjust the phase angle of the main field current with respect to the armature current and thus obtain any desired power factor for the motors. Not only am I emabled, in this manner, to obtain unity power factors for the motors, but I may even provide them with leading current components, thus neutralizing the effect of the inductance of the line transformers and providing unity power factor for the entire transmission system, with consequent economy in power transmission.

Referring to the accompanying drawing, Figure 1 is a diagrammatic view of a dynamo-electric machine of the alternating-current, compensated, commutating type together with its attendant apparatus and control circuits; Fig. 2 is a diagrammatic view of the apparatus shown in Fig. 1 with a slightly modified form of control circuits; Fig. 3 is a chart giving the sequence of switch operation in the control circuits of Fig. 1; Figs. 4 and 5 are simplified diagrammatic views illustrating the development of the connections of the system of Fig. 1 when the switches thereof are operated in the order indicated in Fig. 3; and Fig. 6 is a view of a partial modification of the other systems.

Referring to the form of my invention shown in Fig. 1, 22 is an alternating-current dynamo-electric machine of the commutating type provided with an armature 23, a main field winding 24 and a cross field winding 25. Alternating current is supplied to the machine 22 from any convenient source, such, for example, as the secondary winding 26 of a transformer 27 energized from a transmission system (not shown). The secondary winding 26 is provided with a plurality of voltage taps to which are connected suitable control switches 1, 3, 5, 6, 7, 13, 14 and 15. An auxiliary exciting generator or phase shifter 28 of the repulsion, commutating type specifically described and claimed in my copending application, Serial No. 23,361, filed April 23, 1915, Patented Dec. 10, 1918, No. 1,287,013, and assigned to the Westinghouse Electric & Manufacturing Company is provided to assist in the energization of the main field winding 24. The machine 28 is provided with an armature 29, a main field winding 30 and a cross or inducing field winding 31. Driving torque for the armature 29 may be supplied by any suitable reversible means, such, for example, as a series commutating alternating-current motor 32 connected to a separate secondary winding 33 on the transformer 27 through suitable reversing switches 18 and 19. With the construction shown, a voltage will be generated in the winding 31 which will be substantially in quadrature to that supplied to the winding 30. The brushes of the armature 23 may be connected through a switch 2 in order to operate the machine 22 as a repulsion motor or generator, if desired. The direction of current flow through the main field winding 24, with respect to the direction of current flow in the armature 23, may be reversed by suitable switches 9, 10, 11 and 12. The voltage applied to the windings 30, 24 and 25 may be adjusted by switches 13, 14, 15, 16, 17; by switches 3, 4 and 5 and by switches 6, 7 and 8, respectively. The transition from one voltage tap to another may be made smoothly, without short circuiting a portion of the source, by means of suitable preventive resistance devices 34, 35, 36 and 37, as is well known in the art. If desired, preventive reactance devices may be substituted for these preventive resistance devices. The armature 23 may be driven by any suitable means or may supply energy to any desired device, said means and device being indicated, for example, by a car axle 40.

With the connections thus indicated, the machine 22 may be started as a motor by closing the switches 1, 2, 6, 9, 12, 13 and 19, as indicated in the first accelerating position shown in Fig. 3. Under these conditions, the armature 23 is short circuited through a resistance member 38 so that it will rotate as the armature of a compensated repulsion motor and the main and cross field windings 24 and 25 are connected in series relation. The machine 29 is caused to operate with minimum field excitation. The cross field winding 25 is preferably provided with a larger number of turns than the armature winding 23 so that the current therein is less than the armature current. Both because of this reason and because of the fact that the windings 24 and 25 are connected in series, the current in the winding 24 is relatively small in amount and, hence, the demand upon the exciting machine 28 is relatively small. The switches 7 and 8 are now closed, as indicated in the second and third accelerating positions, thus increasing the total voltage impressed upon the windings of the machine 22. The next step in the operation is brought about by raising the voltage supplied by the machine 28 through the proper manipulation of switches 13, 14, 15, 16 and 17, as indicated in accelerating positions 4 to 7, inclusive. Having brought the machine 22 up to the maximum speed possible, with all the windings thereof connected in series relations, an intermediate connection is introduced between the source 26 and a point intermediate the windings 24 and 25, by the closure of the switch 3. The well known doubly-fed connection is thus established, and subsequent acceleration may be obtained by opening the short circuiting switch 2 and increasing the voltage supplied to the armature 23 through suitable manipulation of the switches 4 and 5. Because of the fact that the main field winding 24 is in intimate connection with the source 26 through this intermediate tap, when the voltage supplied by the source is increased, the necessity for excitation from the auxiliary machine 28 decreases, and, accordingly, the voltage provided by this machine is lowered by the reverse manipulation of the switches 13, 14, 15, 16 and 17, as indicated in accelerating positions 12 to 15, inclusive.

When it is desired to regenerate and supply power to the system, it is necessary that the connections from the main field winding 24 to the supply circuit be reversed and also that the polarity of the machine 28 be reversed with respect to the motor connection. This result may be obtained by opening switches 9, 12 and 19 and closing switches 10, 11 and 18, as indicated in the regenerating portion of Fig. 3. Otherwise, the steps for the gradual increase of the energy supplied by the machine 22 to the source 26 are exactly the same as the accelerating steps when the machine 22 is operating as a motor.

The above-mentioned operation is clearly indicated in Figs. 4 and 5. Thus, in Fig. 4, which relates particularly to the accelerating process, Fig. 4a illustrates the initial connections established in the first accelerating step; Fig. 4b indicates the increase in the voltage applied to the outer cross-field tap by the operation of steps 2 and 3; Fig. 4c indicates the increase in the auxiliary phase modifying voltage by increase of the phase-converter field strength as brought about by steps 4, 5, 6 and 7; Fig. 4ᵈ indicates the transition from repulsion to doubly-fed operation, as effected in steps 8 and 9; Fig. 4ᵉ indicates the increase in the voltage applied to the intermediate doubly-fed tap, as effected in steps 10 and 11; and Fig. 4ᶠ indicates the reduction in the magnitude of the auxiliary phase modifying electromotive force, effected in positions 12 to 15, inclusive.

In a similar manner, Fig. 5 illustrates the development of the connections during regenerative operation. The manipulation of the various switches is the same as indicated in Fig. 4 but the magnetizing-field winding 24 is inserted in the reverse manner and the field winding of the driving motor 32 is also reversed so that the phase-converter 28 rotates in the opposite direction, reversing the phase of the auxiliary phase-modifying electromotive force.

It will be observed that, with the circuit of Fig. 1, it is necessary to temporarily interrupt the armature current of the machine 22 when reversing the main field winding thereof from the position of motor action to that of generator action or vice versa. As this opening of the circuit might lead to serious line disturbances and to a jolt in a railway vehicle driven by the motor, I may provide switches 20 and 21 and a preventive resistance 39, as indicated in Fig. 2. When it is desired to change from one type of operation to the other, the switch 20 is first closed, permitting a portion of the armature current to traverse the preventive device 39 and the switch 21 is then closed, short-circuiting the magnetizing-field winding. Said field winding may then have its connections reversed without opening the armature circuit. At the conclusion of said reversing process, the switch 21 is first opened and then the switch 20, thus gradually restoring the flow of armature current to the magnetizing-field winding without at any time interrupting the armature circuit.

Throughout this case, I have described the machine 28 as assisting in the excitation of the winding 24 but the relative adjustment of the voltages may be such that, when a weak field is desired from the winding 24, the exciting effect of the machine 28 will be opposed to the exciting effect derived directly from the main source.

If, in operating the systems illustrated, the constants of the motor circuits are found to be such that a tendency to pick up with direct-current or low-frequency-alternating-current excitation exists, any of the well-known methods for obviating this difficulty may be employed: for instance, the use of a transformer to separate the armature and exciting-field-winding circuits, thus permitting the transfer of alternating-current while preventing the transfer of direct-current energy, in a manner similar to that shown in Fig. 15 of an article by Niethammer and Siegel, published in "*Ēlectrotechnik und Maschinenbau*" (Vienna) Dec. 31, 1911, pp. 1092–1095, and as illustrated in Fig. 6.

While I have shown and described my invention in two of its preferred forms, it is obvious to those skilled in the art that it is susceptible of various minor changes and modifications without departing from the spirit thereof, and I accordingly desire that no restrictions shall be placed thereupon except such as are imposed by the prior art or are specifically set forth in the appended claims.

I claim as my invention:

1. The combination with a dynamo-electric machine of the commutating type provided with windings arranged to induce a main field and with windings carrying a working current for producing torque in conjunction with said main field, of a main source of alternating current, connections from said main source to the windings of said machine, including a series connection of said main-field-producing windings with another winding carrying a current substantially proportional to the working current, an auxiliary source of alternating current of like frequency to said main source but of displaced phase relation with respect thereto, connections whereby said auxiliary source affects the excitation of said main field, and means for effecting regenerative operation of said machine with the connections of the main field winding and the auxiliary source reversed with respect to their relation during accelerating operation of said machine in the same direction.

2. The combination with a dynamo-electric machine of the alternating-current commutating type provided with windings arranged to induce a main field and with a cross field winding, the latter having a number of turns different from that of the armature, of a main source of alternating current, an auxiliary source of alternating current connected to influence the excitation of the main field, and means for changing said main field winding and said auxiliary source together as a unit from one circuit to another, and means for changing the voltage of the auxiliary source substantially at the same time to cause a material change in the main-field-current value, whereby the average current flow from said auxiliary source is limited to a relatively small amount.

3. The method of gradually increasing the internal electromotive force of an alternating-current dynamo-electric machine of the commutating type provided with main and cross field windings, supplied from a main source of alternating current provided with a plurality of voltage taps, and deriving a portion of the exciting current for its main field from an auxiliary source of alternating current of like frequency but of adjustable voltage and of displaced phase relation with respect to said main source, which comprises starting said machine with a short circuited armature and with the main and cross field windings connected in series relation across a portion of said source, increasing the voltage applied to the armature and cross field windings, increasing the voltage supplied by said auxiliary source, introducing an intermediate connection from the main source to a point between the cross field winding and the armature winding, opening the armature short-circuit, raising the voltage applied to the armature through this intermediate connection, and decreasing the voltage supplied by said auxiliary source to the main field winding.

4. The method of gradually increasing the load of an alternating-current generator of the series commutating type provided with main and cross field windings, connected to a consumption circuit provided with a plurality of voltage taps and deriving a portion of the exciting current for its main field from an auxiliary source of alternating current of like frequency but of adjustable voltage and of displaced phase relation with respect to said main consumption circuit, which comprises starting said generator as a machine of the repulsion type with its main and cross field windings connected in series relation with the armature winding, increasing the voltage applied to the armature and cross field windings, increasing the voltage supplied by said auxiliary source, introducing an intermediate connection from the consumption circuit to a point between the cross field winding and the armature winding, opening the repulsion connection, raising the voltage applied to the armature through this intermediate connection, and decreasing the voltage supplied by said auxiliary source to the main field winding.

5. The combination with a main dynamo-electric machine of the commutating type provided with windings arranged to induce a main field and with windings carrying a working current, of a main source of alternating current, connections from said main source to the windings of said machine including a series connection of said main-field-producing windings with another winding carrying a current substantially proportional to the working current, auxiliary dynamo-electric means of displaced phase relation with respect to said source, connections whereby said auxiliary source affects the excitation of said main field, means for effecting regenerative operation of said machine with the connections of the main field winding and the auxiliary source reversed with respect to their relation during accelerating operation of said machine in the same direction, and means for effecting said reversals of connections and also of the direction of rotation of said auxiliary dynamo-electric means to effect reversed rotation of the main machine during accelerating operation.

In testimony whereof I have hereunto subscribed my name this 23rd day of April, 1915.

RUDOLF E. HELLMUND.